UNITED STATES PATENT OFFICE 2,549,396

HIGH-TEMPERATURE VULCANIZATION

Albert A. Somerville, Carmel, N. Y., assignor to R. T. Vanderbilt Company, Inc., New York, N. Y., a corporation of New York No Drawing. Application May 17, 1949, Serial No. 93,839

4 Claims. (Cl. 260—793)

My invention relates to improvements in the compounding of rubber for high temperature vulcanization and the vulcanization of rubber compounds at high temperature. In summary, my invention consists in the acceleration of the vulcanization of rubber stocks with sulfur at temperatures in excess of 335° F., particularly at temperatures of 350–450° F., with bismuth dimethyl dithiocarbamate, or, more broadly stated, with bismuth dialkyl dithiocarbamates in which the alkyl groups are methyl, ethyl, propyl, butyl and amyl groups and during a brief period measured in seconds.

In the continuous vulcanization of compounded rubber insulation on electrical conductors, for example, it has become general practice to extrude rubber stock upon the conductor or the conductor composite to be insulated and then to pass the thus jacketed conductor through a tube, closed with seals appropriate to permit passage of the jacketed conductor but to prevent escape of steam, within which the rubber stock is vulcanized by exposure to steam within the tube. It will be apparent that, in such practice, the speed with which vulcanization proceeds in the tube will determine the length of the tube and the speed of the jacketed conductor through the tube in each instance. As the speed with which the vulcanization proceeds increases, the required tube length decreases, the speed of travel of the jacketed conductor may be increased and the output of the extrusion and vulcanization equipment increases per unit of investment cost. Thus, the practical art has, virtually since the advent of this practice, been seeking means to increase the speed with which the vulcanization proceeds in such operations.

It would seem apparent that the speed of the vulcanization reaction could be increased by increasing the vulcanization temperature and by using relatively more active vulcanization accelerators. However, the properties of vulcanization accelerators in general use are, within the range of vulcanization temperature which otherwise might be selected for practical use in such operations, such that the problem has not thus been solved. In particular, conventional accelerators of activity sufficient to effect the required vulcanization with sulfur in, for example, a matter of seconds, tend to be so active that vulcanization begins during preliminary processing, that is before the rubber stock is in place in final form on the conductor or conductor composite, with the result that the product is deficient in physical properties. This effect is commonly designated "scorching."

I have confirmed by experimentation my conception that bismuth dimethyl dithiocarbamate has unusual properties in terms of its activity as a vulcanization accelerator with respect to the temperature and time of vulcanization. The corresponding zinc dialkyl dithiocarbamates, accelerators which are widely used, might appear as a matter of constitution to be similar compounds for example, but as vulcanization accelerators zinc dimethyl and zinc diethyl dithiocarbamates are sometimes relatively more active at temperatures below 300° F. whereas bismuth dimethyl dithiocarbamate is relatively more active at higher temperatures. This reversal in relative activity at higher temperatures makes it possible for me to compound rubber stocks with bismuth dimethyl dithiocarbamate for vulcanization at temperatures above 335° F. and particularly at temperatures of 350–450° F., with which scorching is easily avoided and with which excellent physical properties are attained upon vulcanization at such high temperatures while, at the same time, sufficient acceleration can thus be imparted to effect vulcanization within a matter of seconds, say, from 5 seconds to less than one minute, and preferably and advantageously at from 5 seconds to 30 seconds or less, at such temperatures. While my invention is of special utility in connection with continuous vulcanization operations of the sort to which I have previously referred, it is generally useful in connection with the vulcanization of rubber with sulfur within the range of temperatures stated. The sulfur reacting with the rubber during vulcanization may be supplied as such or as a component of a vulcanization agent, one or more of the thiuram polysulfides for example. I have discovered that compounding and vulcanizing rubber stocks in accordance with my invention assists in imparting improved resistance to failure on flexing to the vulcanized products.

The practice and the advantages of my invention will be illustrated by the following examples in which I have detailed the vulcanization with sulfur of a variety of rubber stocks at a variety of temperatures and the physical properties of the several products obtained in each instance. For purposes of comparison, I have included the results for vulcanization at 260° F., a conventional vulcanization temperature, for several rubber stocks and I have also included for the same purpose, stocks differing only in the substitution of an accelerator in general use for bismuth dimethyl dithiocarbamate and stocks differing in the proportion of bismuth dimethyl dithiocarbamate included. In the tabulation of the stocks, cures or vulcanizations, and physical properties constituting these examples, the stock of each sample was made up of the number of parts by weight indicated opposite each component, the cures at 260° F. and 300° F. were in a platen press and the cures at higher temperatures were in open steam for the periods indicated at the left under each curing temperature, and for each period of cure the values for stress in pounds per square inch at 300% elongation appear under "S," for tensile strength in pounds per square inch under "T" and for percentage elongation at break under "E." In addition, the values for Shore hardness appear under "H" for the cures at 260° F. and 300° F., and the values determined by subjecting the stocks to the Mooney scorch test at 220° F.

EXAMPLE 1

| | |
|---|---|
| Smoked sheet | 100 |
| Stearic acid | 2 |
| Zinc oxide | 3 |
| Paraflux | 4 |
| Channel carbon black | 50 |
| Sulfur | 1 |
| Zinc dimethyl dithiocarbamate | 1 |

| 320° F.: | S | T | E |
|---|---|---|---|
| 30 seconds | 230 | 2210 | 600 |
| 45 seconds | 510 | 3150 | 620 |
| 60 seconds | 620 | 3320 | 580 |
| 90 seconds | 690 | 3380 | 570 |
| 120 seconds | 690 | 3250 | 560 |
| 150 seconds | 670 | 3080 | 550 |
| 180 seconds | 590 | 3200 | 570 |

| 338° F.: | S | T | E |
|---|---|---|---|
| 15 seconds | 90 | 470 | 560 |
| 30 seconds | 430 | 2790 | 590 |
| 45 seconds | 580 | 3180 | 580 |
| 60 seconds | 660 | 3360 | 570 |
| 90 seconds | 650 | 3120 | 560 |
| 120 seconds | 620 | 3100 | 560 |
| 150 seconds | 550 | 2800 | 550 |

| 353° F.: | S | T | E |
|---|---|---|---|
| 10 seconds | 95 | 470 | 700 |
| 15 seconds | 210 | 1880 | 620 |
| 30 seconds | 630 | 3140 | 580 |
| 45 seconds | 640 | 3310 | 570 |
| 60 seconds | 670 | 3040 | 560 |
| 90 seconds | 570 | 2740 | 550 |
| 120 seconds | 510 | 2640 | 560 |

| 366° F.: | S | T | E |
|---|---|---|---|
| 7½ seconds | | Uncured | |
| 10 seconds | 220 | 1980 | 620 |
| 15 seconds | 530 | 2990 | 600 |
| 30 seconds | 600 | 3110 | 580 |
| 45 seconds | 560 | 2940 | 570 |
| 60 seconds | 470 | 2400 | 540 |
| 90 seconds | 410 | 2090 | 530 |
| 120 seconds | 360 | 2200 | 590 |

| 377° F.: | S | T | E |
|---|---|---|---|
| 7½ seconds | 95 | 670 | 700 |
| 10 seconds | 460 | 2690 | 560 |
| 15 seconds | 480 | 2970 | 610 |
| 30 seconds | 570 | 2890 | 570 |
| 45 seconds | 540 | 2770 | 560 |
| 60 seconds | 450 | 2480 | 560 |
| 90 seconds | 390 | 2290 | 580 |

| 388° F.: | S | T | E |
|---|---|---|---|
| 5 seconds | 110 | 730 | 590 |
| 7½ seconds | 300 | 2060 | 580 |
| 10 seconds | 500 | 2830 | 580 |
| 15 seconds | 560 | 3090 | 570 |
| 30 seconds | 470 | 2570 | 570 |
| 60 seconds | 350 | 1940 | 540 |

EXAMPLE 2

| | |
|---|---|
| Smoked sheet | 100 |
| Stearic acid | 2 |
| Zinc oxide | 3 |
| Paraflux | 4 |
| Channel carbon black | 50 |
| Sulfur | 1 |
| Bismuth dimethyl dithiocarbamate | 1 |

| 320° F.: | S | T | E |
|---|---|---|---|
| 30 seconds | 180 | 1820 | 670 |
| 45 seconds | 390 | 2880 | 630 |
| 60 seconds | 680 | 3680 | 610 |
| 90 seconds | 830 | 3790 | 570 |
| 120 seconds | 850 | 3780 | 560 |
| 150 seconds | 870 | 3670 | 550 |
| 180 seconds | 880 | 3600 | 550 |

| 338° F.: | S | T | E |
|---|---|---|---|
| 15 seconds | 90 | 930 | 750 |
| 30 seconds | 390 | 2880 | 620 |
| 45 seconds | 730 | 3560 | 590 |
| 60 seconds | 810 | 3710 | 580 |
| 90 seconds | 860 | 3660 | 560 |
| 120 seconds | 810 | 3560 | 550 |
| 150 seconds | 720 | 3210 | 540 |

| 353° F.: | S | T | E |
|---|---|---|---|
| 10 seconds | 85 | 1010 | 720 |
| 15 seconds | 220 | 2130 | 660 |
| 30 seconds | 720 | 3450 | 580 |
| 45 seconds | 820 | 3660 | 560 |
| 60 seconds | 810 | 3480 | 550 |
| 90 seconds | 750 | 3250 | 540 |
| 120 seconds | 670 | 3140 | 540 |

| 366° F.: | S | T | E |
|---|---|---|---|
| 7½ seconds | 110 | 1370 | 700 |
| 10 seconds | 310 | 2710 | 650 |
| 15 seconds | 700 | 3640 | 600 |
| 30 seconds | 780 | 3590 | 560 |
| 45 seconds | 730 | 3350 | 540 |
| 60 seconds | 680 | 3250 | 540 |
| 90 seconds | 590 | 2900 | 540 |
| 120 seconds | 530 | 2920 | 570 |

| 377° F.: | S | T | E |
|---|---|---|---|
| 7½ seconds | 140 | 1630 | 670 |
| 10 seconds | 650 | 3460 | 610 |
| 15 seconds | 700 | 3540 | 600 |
| 30 seconds | 800 | 3470 | 560 |
| 45 seconds | 710 | 3270 | 550 |
| 60 seconds | 670 | 3260 | 550 |
| 90 seconds | 560 | 2800 | 550 |

| 388° F.: | S | T | E |
|---|---|---|---|
| 5 seconds | 160 | 1530 | 630 |
| 7½ seconds | 340 | 2770 | 640 |
| 10 seconds | 650 | 3540 | 600 |
| 15 seconds | 780 | 3580 | 580 |
| 30 seconds | 650 | 3270 | 550 |
| 60 seconds | 500 | 2780 | 560 |

EXAMPLE 3

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 0.50 |
| Zinc dimethyl dithiocarbamate | 1 |

| 260° F.: | S | T | E | H |
|---|---|---|---|---|
| 10 minutes | | Uncured | | |
| 15 minutes | | Uncured | | |
| 20 minutes | 475 | 1380 | 560 | 43 |
| 30 minutes | 475 | 1490 | 575 | 43 |
| 45 minutes | 490 | 1560 | 555 | 45 |

Column 5

300° F.:

| | S | T | E | H |
|---|---|---|---|---|
| 2½ minutes | Uncured | | | |
| 5 minutes | 540 | 1490 | 540 | 46 |
| 10 minutes | 550 | 1610 | 555 | 47 |
| 15 minutes | 510 | 1610 | 580 | 46 |
| 20 minutes | 455 | 1435 | 570 | 43 |

388° F.:

| | S | T | E |
|---|---|---|---|
| 5 seconds | Uncured | | |
| 7½ seconds | Uncured | | |
| 10 seconds | Uncured | | |
| 15 seconds | 530 | 1225 | 515 |
| 20 seconds | 480 | 1260 | 520 |
| 30 seconds | 340 | 845 | 505 |
| 60 seconds | 220 | 530 | 495 |

*Scorch test*

| | |
|---|---|
| Initial set-up _____ minutes__ | 27 |
| 3 point rise _____ do____ | 14 |
| Total _____ do____ | 41 |
| Rate of rise _____ | 0.25 |

EXAMPLE 4

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulphur | 0.50 |
| Bismuth dimethyl dithiocarbamate | 1 |

260° F.:

| | S | T | E | H |
|---|---|---|---|---|
| 10 minutes | Slightly cured | | | |
| 15 minutes | 610 | 1900 | 565 | 49 |
| 20 minutes | 660 | 1800 | 520 | 49 |
| 30 minutes | 635 | 1775 | 535 | 49 |
| 45 minutes | 610 | 1600 | 535 | 49 |

300° F.:

| | S | T | E | H |
|---|---|---|---|---|
| 2½ minutes | 740 | 2080 | 530 | 51 |
| 5 minutes | 690 | 2070 | 550 | 51 |
| 10 minutes | 685 | 1975 | 550 | 50 |
| 15 minutes | 665 | 1950 | 555 | 50 |
| 20 minutes | 650 | 1880 | 550 | 50 |

388° F.:

| | S | T | E |
|---|---|---|---|
| 5 seconds | 645 | 1740 | 500 |
| 7½ seconds | 710 | 1930 | 515 |
| 10 seconds | 720 | 1740 | 475 |
| 15 seconds | 720 | 2010 | 520 |
| 20 seconds | 675 | 1835 | 500 |
| 30 seconds | 680 | 1685 | 500 |
| 60 seconds | 585 | 1350 | 465 |

*Scorch test*

| | |
|---|---|
| Initial set-up _____ minutes__ | 17 |
| 3 point rise _____ do____ | 16 |
| Total _____ do____ | 33 |
| Rate of rise _____ | 0.25 |

EXAMPLE 5

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 1 |
| Zinc dimethyl dithiocarbamate | 1 |

260° F.:

| | S | T | E | H |
|---|---|---|---|---|
| 10 minutes | Uncured | | | |
| 15 minutes | 580 | 1830 | 555 | 49 |
| 20 minutes | 625 | 1890 | 555 | 51 |
| 30 minutes | 670 | 1890 | 535 | 51 |
| 45 minutes | 625 | 1475 | 520 | 51 |

Column 6

300° F.:

| | S | T | E | H |
|---|---|---|---|---|
| 2½ minutes | Slightly cured | | | |
| 5 minutes | 745 | 1560 | 470 | 53 |
| 10 minutes | 625 | 1890 | 565 | 51 |
| 15 minutes | 615 | 1645 | 535 | 51 |
| 20 minutes | 605 | 1815 | 570 | 50 |

388° F.:

| | S | T | E |
|---|---|---|---|
| 5 seconds | 615 | 1435 | 490 |
| 7½ seconds | 700 | 1450 | 460 |
| 10 seconds | 740 | 1635 | 470 |
| 15 seconds | 720 | 1545 | 460 |
| 20 seconds | 660 | 1325 | 440 |
| 30 seconds | 570 | 1325 | 490 |
| 60 seconds | 435 | 975 | 490 |

*Scorch test*

| | |
|---|---|
| Initial set-up _____ minutes__ | 21 |
| 3 point rise _____ do____ | 7 |
| Total _____ do____ | 28 |
| Rate of rise _____ | 1.0 |

EXAMPLE 6

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 1 |
| Bismuth dimethyl dithiocarbamate | 1 |

260° F.:

| | S | T | E | H |
|---|---|---|---|---|
| 10 minutes | 680 | 2010 | 535 | 51 |
| 15 minutes | 800 | 2240 | 525 | 56 |
| 20 minutes | 850 | 2275 | 525 | 56 |
| 30 minutes | 810 | 2075 | 510 | 56 |
| 45 minutes | 740 | 2140 | 535 | 54 |

300° F.:

| | S | T | E | H |
|---|---|---|---|---|
| 2½ minutes | 940 | 2490 | 515 | 59 |
| 5 minutes | 875 | 2270 | 520 | 59 |
| 10 minutes | 780 | 2150 | 525 | 56 |
| 15 minutes | 770 | 2215 | 545 | 56 |
| 20 minutes | 735 | 2010 | 530 | 56 |

388° F.:

| | S | T | E |
|---|---|---|---|
| 5 seconds | 855 | 2310 | 520 |
| 7½ seconds | 880 | 2200 | 500 |
| 10 seconds | 865 | 2280 | 505 |
| 15 seconds | 810 | 2110 | 500 |
| 20 seconds | 800 | 1980 | 490 |
| 30 seconds | 755 | 1895 | 505 |
| 60 seconds | 660 | 1725 | 515 |

*Scorch test*

| | |
|---|---|
| Initial set-up _____ minutes__ | 10 |
| 3 point rise _____ do____ | 13 |
| Total _____ do____ | 23 |
| Rate of rise _____ | 0.5 |

EXAMPLE 7

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 2 |
| Bismuth dimethyl dithiocarbamate | 0.50 |

260° F.:

| | S | T | E | H |
|---|---|---|---|---|
| 10 minutes | 960 | 2470 | 525 | 59 |
| 15 minutes | 1010 | 2420 | 515 | 60 |
| 20 minutes | 970 | 2360 | 520 | 61 |
| 30 minutes | 920 | 2160 | 515 | 61 |
| 45 minutes | 935 | 2160 | 500 | 61 |

| 300° F.: | S | T | E | H |
|---|---|---|---|---|
| 2½ minutes | 925 | 2410 | 530 | 59 |
| 5 minutes | 950 | 2250 | 510 | 59 |
| 10 minutes | 810 | 2140 | 530 | 59 |
| 15 minutes | 725 | 2060 | 555 | 58 |
| 20 minutes | 710 | 1900 | 535 | 56 |
| 388° F.: | S | T | E | |
| 5 seconds | 685 | 1950 | 525 | |
| 7½ seconds | 725 | 2030 | 515 | |
| 10 seconds | 805 | 2080 | 510 | |
| 15 seconds | 790 | 2030 | 510 | |
| 20 seconds | 770 | 1985 | 510 | |
| 30 seconds | 705 | 1820 | 505 | |
| 60 seconds | 605 | 1475 | 505 | |

*Scorch test*

| | | |
|---|---|---|
| Initial set-up | minutes | 7 |
| 3 point rise | do | 7 |
| Total | do | 14 |
| Rate of rise | | 0.5 |

EXAMPLE 8

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 2 |
| Zinc dimethyl dithiocarbamate | 0.50 |

| 260° F.: | S | T | E | H |
|---|---|---|---|---|
| 10 minutes | 695 | 2060 | 545 | 55 |
| 15 minutes | 760 | 2100 | 540 | 59 |
| 20 minutes | 785 | 2080 | 540 | 59 |
| 30 minutes | 745 | 2080 | 540 | 58 |
| 45 minutes | 740 | 2060 | 550 | 56 |
| 300° F.: | S | T | E | H |
| 2½ minutes | 720 | 2050 | 535 | 53 |
| 5 minutes | 750 | 2040 | 540 | 56 |
| 10 minutes | 615 | 1945 | 585 | 53 |
| 15 minutes | 585 | 1800 | 585 | 52 |
| 20 minutes | 565 | 1770 | 560 | 51 |
| 388° F.: | S | T | E | |
| 5 seconds | 595 | 1315 | 475 | |
| 7½ seconds | 640 | 1290 | 460 | |
| 10 seconds | 730 | 1685 | 490 | |
| 15 seconds | 745 | 1590 | 470 | |
| 20 seconds | 730 | 1605 | 485 | |
| 30 seconds | 635 | 1280 | 455 | |
| 60 seconds | 530 | 1205 | 495 | |

*Scorch test*

| | | |
|---|---|---|
| Initial set-up | minutes | 12 |
| 3 point rise | do | 8 |
| Total | do | 20 |
| Rate of rise | | 0.75 |

EXAMPLE 9

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 3 |
| Bismuth dimethyl dithiocarbamate | 0.25 |

| 260° F.: | S | T | E | H |
|---|---|---|---|---|
| 10 minutes | 720 | 2140 | 550 | 51 |
| 15 minutes | 760 | 2150 | 535 | 54 |
| 20 minutes | 770 | 2160 | 535 | 54 |
| 30 minutes | 810 | 2220 | 535 | 56 |
| 45 minutes | 800 | 2075 | 525 | 58 |

| 300° F.: | S | T | E | H |
|---|---|---|---|---|
| 2½ minutes | 675 | 2010 | 555 | 50 |
| 5 minutes | 720 | 2060 | 550 | 52 |
| 10 minutes | 725 | 2010 | 540 | 54 |
| 15 minutes | 670 | 1910 | 540 | 53 |
| 20 minutes | 635 | 1830 | 555 | 52 |
| 388° F.: | S | T | E | |
| 5 seconds | 530 | 1470 | 530 | |
| 7½ seconds | 580 | 1500 | 510 | |
| 10 seconds | 600 | 1545 | 500 | |
| 15 seconds | 640 | 1565 | 485 | |
| 20 seconds | 610 | 1380 | 455 | |
| 30 seconds | 590 | 1445 | 485 | |
| 60 seconds | 625 | 1435 | 480 | |

*Scorch test*

| | | |
|---|---|---|
| Initial set-up | minutes | 6 |
| 3 point rise | do | 6 |
| Total | do | 12 |
| Rate of rise | | 1.0 |

EXAMPLE 10

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 3 |
| Zinc dimethyl dithiocarbamate | 0.25 |

| 260° F.: | S | T | E | H |
|---|---|---|---|---|
| 10 minutes | 640 | 1925 | 545 | 50 |
| 15 minutes | 755 | 2150 | 545 | 52 |
| 20 minutes | 780 | 2075 | 535 | 56 |
| 30 minutes | 775 | 2000 | 525 | 56 |
| 45 minutes | 800 | 2080 | 535 | 57 |
| 300° F.: | S | T | E | H |
| 2½ minutes | 645 | 1660 | 510 | 49 |
| 5 minutes | 690 | 1950 | 545 | 52 |
| 10 minutes | 665 | 1840 | 555 | 53 |
| 15 minutes | 590 | 1820 | 585 | 53 |
| 20 minutes | 590 | 1740 | 575 | 52 |
| 388° F.: | S | T | E | |
| 5 seconds | 355 | 930 | 510 | |
| 7½ seconds | 500 | 1200 | 510 | |
| 10 seconds | 595 | 1420 | 490 | |
| 15 seconds | 600 | 1435 | 495 | |
| 20 seconds | 580 | 1310 | 480 | |
| 30 seconds | 580 | 1240 | 480 | |
| 60 seconds | 620 | 1190 | 460 | |

*Scorch test*

| | | |
|---|---|---|
| Initial set-up | minutes | 10 |
| 3 point rise | do | 6 |
| Total | do | 16 |
| Rate of rise | | 1.5 |

EXAMPLE 11

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 2.50 |
| Zinc dimethyl dithiocarbamate | 0.25 |
| Benzothiazyl disulfide | 1 |

| 260° F.: | S | T | E | H |
|---|---|---|---|---|
| 10 minutes | | Uncured | | |
| 15 minutes | | Uncured | | |
| 20 minutes | | Uncured | | |
| 30 minutes | 965 | 2260 | 515 | 61 |
| 45 minutes | 975 | 2230 | 515 | 61 |

2,549,396

Column 1 (page 9)

| 300° F.: | S | T | E | H |
|---|---|---|---|---|
| 2½ minutes | Uncured | | | |
| 5 minutes | 930 | 2370 | 520 | 59 |
| 10 minutes | 930 | 2370 | 520 | 61 |
| 15 minutes | 920 | 2175 | 525 | 60 |
| 20 minutes | 850 | 1880 | 510 | 57 |

| 388° F.: | S | T | E |
|---|---|---|---|
| 5 seconds | Slightly cured | | |
| 7½ seconds | 120 | 205 | 405 |
| 10 seconds | 460 | 835 | 440 |
| 15 seconds | 940 | 2040 | 475 |
| 20 seconds | 920 | 2000 | 475 |
| 30 seconds | 890 | 1910 | 490 |
| 60 seconds | 740 | 1550 | 490 |

*Scorch test*

Initial set-up _____minutes__ 54
Total _____do____ over 60

EXAMPLE 12

| | |
|---|---|
| Smoked sheet | 100 |
| Plasticizer | 1 |
| Zinc oxide | 50 |
| Stearic acid | 1 |
| Whiting | 50 |
| Kaolin | 50 |
| Heptylated diphenyl amine | 2 |
| Sulfur | 2.50 |
| Bismuth dimethyl dithiocarbamate | 0.25 |
| Benzothiazyl disulfide | 1 |

| 260° F.: | S | T | E | H |
|---|---|---|---|---|
| 10 minutes | 1025 | 2480 | 515 | 60 |
| 15 minutes | 1070 | 2510 | 515 | 63 |
| 20 minutes | 1070 | 2350 | 500 | 63 |
| 30 minutes | 1070 | 2270 | 500 | 64 |
| 45 minutes | 1000 | 2140 | 500 | 64 |

| 300° F.: | S | T | E | H |
|---|---|---|---|---|
| 2½ minutes | 1035 | 2140 | 500 | 61 |
| 5 minutes | 1045 | 2330 | 500 | 62 |
| 10 minutes | 980 | 2140 | 500 | 62 |
| 15 minutes | 900 | 2050 | 510 | 61 |
| 20 minutes | 860 | 2020 | 515 | 61 |

| 388° F.: | S | T | E |
|---|---|---|---|
| 5 seconds | Uncured | | |
| 7½ seconds | 590 | 1010 | 410 |
| 10 seconds | 920 | 1980 | 470 |
| 15 seconds | 1060 | 2260 | 465 |
| 20 seconds | 970 | 2220 | 480 |
| 30 seconds | 930 | 2010 | 475 |
| 60 seconds | 760 | 1800 | 500 |

*Scorch test*

Initial set-up _____minutes__ 19
3 point rise _____do____ 4
Total _____do____ 23
Rate of rise _____ 1.0

EXAMPLE 13

| | |
|---|---|
| Smoked sheet | 100 |
| Stearic acid | 1 |
| Zinc oxide | 3 |
| Channel carbon black | 45 |
| Sulfur | 2 |
| Bismuth dimethyl dithiocarbamate | 0.1 |

| 260° F.: | S | T | E | H |
|---|---|---|---|---|
| 5 minutes | Uncured | | | |
| 10 minutes | Slightly cured | | | |
| 15 minutes | 67 | 515 | 780 | 26 |
| 20 minutes | 115 | 635 | 755 | 29 |
| 30 minutes | 130 | 935 | 685 | 31 |
| 45 minutes | 300 | 1160 | 620 | 39 |

Column 2 (page 10)

| 300° F.: | S | T | E | H |
|---|---|---|---|---|
| 2½ minutes | Slightly cured | | | |
| 5 minutes | 155 | 1135 | 720 | 31 |
| 10 minutes | 310 | 1135 | 720 | 39 |
| 15 minutes | 390 | 1335 | 600 | 40 |
| 20 minutes | 380 | 1295 | 590 | 41 |
| 30 minutes | 410 | 1185 | 540 | 41 |

| 388° F.: | S | T | E |
|---|---|---|---|
| 5 seconds | 35 | 175 | 795 |
| 7½ seconds | 71 | 870 | 735 |
| 10 seconds | 260 | 1740 | 695 |
| 15 seconds | 380 | 2010 | 650 |
| 20 seconds | 470 | 1910 | 600 |
| 30 seconds | 570 | 1645 | 515 |
| 60 seconds | 695 | 1940 | 525 |

*Scorch test*

Initial set-up _____minutes__ 51
3 point rise _____do____ 38
Total _____do____ 89
Rate of rise _____ 0.25

EXAMPLE 14

| | |
|---|---|
| Smoked sheet | 100 |
| Stearic acid | 1 |
| Zinc oxide | 3 |
| Channel carbon black | 45 |
| Sulfur | 2 |
| Bismuth dimethyl dithiocarbamate | 0.2 |

| 260° F.: | S | T | E | H |
|---|---|---|---|---|
| 5 minutes | Slightly cured | | | |
| 10 minutes | 130 | 1030 | 780 | 30 |
| 15 minutes | 235 | 1285 | 670 | 35 |
| 20 minutes | 500 | 1965 | 630 | 41 |
| 30 minutes | 790 | 2330 | 570 | 48 |
| 45 minutes | 1005 | 2790 | 555 | 51 |

| 300° F.: | S | T | E | H |
|---|---|---|---|---|
| 2½ minutes | 220 | 1325 | 690 | 31 |
| 5 minutes | 635 | 2420 | 610 | 43 |
| 10 minutes | 850 | 2550 | 570 | 47 |
| 15 minutes | 800 | 2130 | 530 | 47 |
| 20 minutes | 830 | 2100 | 515 | 48 |
| 30 minutes | 820 | 1910 | 510 | 48 |

| 388° F.: | S | T | E |
|---|---|---|---|
| 5 seconds | 36 | 295 | 750 |
| 7½ seconds | 165 | 1515 | 710 |
| 10 seconds | 390 | 2230 | 670 |
| 15 seconds | 590 | 2410 | 640 |
| 20 seconds | 640 | 1935 | 585 |
| 30 seconds | 685 | 2280 | 560 |
| 60 seconds | 750 | 1880 | 500 |

*Scorch test*

Initial set-up _____minutes__ 21
3 point rise _____do____ 10
Total _____do____ 31
Rate of rise _____ 0.5

EXAMPLE 15

| | |
|---|---|
| Smoked sheet | 100 |
| Stearic acid | 1 |
| Zinc oxide | 3 |
| Channel carbon black | 45 |
| Sulfur | 2 |
| Bismuth dimethyl dithiocarbamate | 0.3 |

| 260° F.: | S | T | E | H |
|---|---|---|---|---|
| 5 minutes | Slightly cured | | | |
| 10 minutes | 230 | 1390 | 680 | 36 |
| 15 minutes | 550 | 2650 | 675 | 44 |
| 20 minutes | 990 | 3590 | 660 | 51 |
| 30 minutes | 1285 | 4020 | 620 | 53 |
| 45 minutes | 1390 | 3970 | 580 | 56 |

11

| 300° F.: | S | T | E | H |
|---|---|---|---|---|
| 2½ minutes | 615 | 2770 | 660 | 42 |
| 5 minutes | 990 | 3460 | 620 | 49 |
| 10 minutes | 1085 | 3380 | 570 | 51 |
| 15 minutes | 1115 | 2630 | 510 | 51 |
| 20 minutes | 1075 | 2670 | 510 | 51 |
| 30 minutes | 990 | 2260 | 590 | 51 |

| 388° F.: | S | T | E |
|---|---|---|---|
| 5 seconds | 34 | 430 | 720 |
| 7½ seconds | 395 | 2410 | 680 |
| 10 seconds | 650 | 2710 | 615 |
| 15 seconds | 780 | 3010 | 630 |
| 20 seconds | 860 | 2830 | 585 |
| 30 seconds | 855 | 2760 | 585 |
| 60 seconds | 860 | 2030 | 495 |

*Scorch test*

| | |
|---|---|
| Initial set-up _____minutes__ | 20 |
| 3 point rise _____do____ | 10 |
| Total _____do____ | 30 |
| Rate of rise | 0.5 |

EXAMPLE 16

| | |
|---|---|
| Smoked sheet | 100 |
| Stearic acid | 1 |
| Zinc oxide | 3 |
| Channel carbon black | 45 |
| Sulfur | 2 |
| Bismuth dimethyl dithiocarbamate | 0.5 |

| 260° F.: | S | T | E | H |
|---|---|---|---|---|
| 5 minutes | Slightly cured | | | |
| 10 minutes | 315 | 1920 | 720 | 39 |
| 15 minutes | 835 | 3260 | 660 | 47 |
| 20 minutes | 1370 | 4410 | 645 | 53 |
| 30 minutes | 1805 | 4660 | 585 | 59 |
| 45 minutes | 1885 | 4540 | 570 | 60 |

| 300° F.: | S | T | E | H |
|---|---|---|---|---|
| 2½ minutes | 1090 | 4120 | 650 | 50 |
| 5 minutes | 1505 | 4510 | 620 | 55 |
| 10 minutes | 1650 | 4300 | 580 | 56 |
| 15 minutes | 1520 | 3870 | 550 | 56 |
| 20 minutes | 1445 | 3640 | 535 | 56 |
| 30 minutes | 1415 | 3190 | 510 | 56 |

| 388° F.: | S | T | E |
|---|---|---|---|
| 5 seconds | 105 | 890 | 680 |
| 7½ seconds | 625 | 3060 | 660 |
| 10 seconds | 945 | 3340 | 605 |
| 15 seconds | 1110 | 3530 | 590 |
| 20 seconds | 1095 | 3130 | 560 |
| 30 seconds | 1095 | 2910 | 540 |
| 60 seconds | 990 | 2510 | 515 |

*Scorch test*

| | |
|---|---|
| Initial set-up _____minutes__ | 19 |
| 3 point rise _____do____ | 11 |
| Total _____do____ | 30 |
| Rate of rise | 0.5 |

EXAMPLE 17

| | |
|---|---|
| Smoked sheet | 100 |
| Stearic acid | 1 |
| Zinc oxide | 3 |
| Channel carbon black | 45 |
| Sulfur | 2 |
| Bismuth dimethyl dithiocarbamate | 1.0 |

| 260° F.: | S | T | E | H |
|---|---|---|---|---|
| 5 minutes | Slightly cured | | | |
| 10 minutes | 360 | 1990 | 685 | 39 |
| 15 minutes | 875 | 3390 | 660 | 48 |
| 20 minutes | 1570 | 4720 | 655 | 56 |
| 30 minutes | 2070 | 4720 | 655 | 61 |
| 45 minutes | 2180 | 4580 | 535 | 61 |

12

| 300° F.: | S | T | E | H |
|---|---|---|---|---|
| 2½ minutes | 1455 | 4540 | 635 | 54 |
| 5 minutes | 2130 | 4700 | 560 | 61 |
| 10 minutes | 2310 | 4410 | 505 | 61 |
| 15 minutes | 2270 | 4310 | 585 | 61 |
| 20 minutes | 2220 | 4160 | 480 | 61 |
| 30 minutes | 2170 | 4010 | 465 | 60 |

| 388° F.: | S | T | E |
|---|---|---|---|
| 5 seconds | 415 | 2170 | 600 |
| 7½ seconds | 1285 | 4380 | 630 |
| 10 seconds | 1555 | 4410 | 600 |
| 15 seconds | 1635 | 4390 | 575 |
| 20 seconds | 1665 | 4110 | 550 |
| 30 seconds | 1510 | 3710 | 530 |
| 60 seconds | 1290 | 2800 | 585 |

*Scorch test*

| | |
|---|---|
| Initial set-up _____minutes__ | 18 |
| 3 point rise _____do____ | 9 |
| Total _____do____ | 27 |
| Rate of rise | 0.5 |

EXAMPLE 18

| | |
|---|---|
| Smoked sheet | 100 |
| Stearic acid | 1 |
| Zinc oxide | 3 |
| Channel carbon black | 45 |
| Sulfur | 2 |
| Bismuth dimethyl dithiocarbamate | 2.0 |

| 260° F.: | S | T | E | H |
|---|---|---|---|---|
| 5 minutes | Slightly cured | | | |
| 10 minutes | 350 | 2070 | 700 | 40 |
| 15 minutes | 930 | 3620 | 665 | 49 |
| 20 minutes | 1660 | 4620 | 630 | 58 |
| 30 minutes | 2110 | 4700 | 550 | 62 |
| 45 minutes | 2200 | 4480 | 525 | 62 |

| 300° F.: | S | T | E | H |
|---|---|---|---|---|
| 2½ minutes | 1490 | 4500 | 650 | 55 |
| 5 minutes | 2240 | 4640 | 540 | 61 |
| 10 minutes | 2370 | 4130 | 455 | 61 |
| 15 minutes | 2320 | 4180 | 465 | 61 |
| 20 minutes | 2270 | 4030 | 450 | 61 |
| 30 minutes | 2270 | 3850 | 440 | 61 |

| 388° F.: | S | T | E |
|---|---|---|---|
| 5 seconds | 795 | 3300 | 610 |
| 7½ seconds | 1610 | 4710 | 605 |
| 10 seconds | 2080 | 4610 | 540 |
| 15 seconds | 2140 | 4370 | 500 |
| 20 seconds | 2180 | 4210 | 485 |
| 30 seconds | 2090 | 4000 | 470 |
| 60 seconds | 1860 | 3460 | 450 |

*Scorch test*

| | |
|---|---|
| Initial set-up _____minutes__ | 16 |
| 3 point rise _____do____ | 9 |
| Total _____do____ | 25 |
| Rate of rise | 0.5 |

EXAMPLE 19

| | |
|---|---|
| Smoked sheet | 100 |
| Plasticizer [1] | 1 |
| Stearic acid | 1 |
| Mixed alkylated diarylamines | 2 |
| Kaolin powder | 50 |
| Whiting (water ground) | 50 |
| Sulfur | 1 |
| Zinc oxide | 50 |
| Bismuth dimethyl dithiocarbamate | 1 |

[1] The plasticizer comprises Sulfo A, normal butyl alcohol and mineral oil and is sold under the trade-name Reogen.

260° F.:

| | S | T | E | H |
|---|---|---|---|---|
| 10 minutes | 740 | 1945 | 525 | 51 |
| 15 minutes | 915 | 2280 | 510 | 57 |
| 20 minutes | 925 | 2230 | 510 | 58 |
| 30 minutes | 885 | 2150 | 500 | 57 |
| 45 minutes | 810 | 2030 | 500 | 56 |

388° F.:

| | S | T | E |
|---|---|---|---|
| 5 seconds | 900 | 2170 | 500 |
| 7½ seconds | 950 | 2170 | 480 |
| 10 seconds | 960 | 2150 | 480 |
| 20 seconds | 910 | 2110 | 480 |
| 30 seconds | 840 | 1890 | 480 |
| 60 seconds | 730 | 1910 | 500 |

EXAMPLE 20

| | |
|---|---|
| Smoked sheet | 100 |
| Plasticizer [1] | 1 |
| Stearic acid | 1 |
| Mixed alkylated diarylamines | 2 |
| Kaolin powder | 50 |
| Whiting (water ground) | 50 |
| Zinc oxide | 50 |
| Sulfur | 1 |
| Zinc dimethyl dithiocarbamate | 1 |

[1] The plasticizer comprises Sulfo A, normal butyl alcohol and mineral oil and is sold under the trade-name Reogen.

260° F.:

| | S | T | E | H |
|---|---|---|---|---|
| 10 minutes | 715 | 1890 | 540 | 50 |
| 15 minutes | 725 | 1940 | 540 | 52 |
| 20 minutes | 745 | 1975 | 535 | 52 |
| 30 minutes | 655 | 1725 | 525 | 52 |
| 45 minutes | 625 | 1610 | 510 | 50 |

388° F.:

| | S | T | E |
|---|---|---|---|
| 5 seconds | 465 | 1085 | 490 |
| 7½ seconds | 700 | 1625 | 480 |
| 10 seconds | 780 | 1970 | 500 |
| 20 seconds | 730 | 1875 | 510 |
| 30 seconds | 660 | 1460 | 500 |
| 60 seconds | 530 | 1410 | 510 |

EXAMPLE 21

| | |
|---|---|
| Smoked sheet | 100 |
| Plasticizer [1] | 1 |
| Stearic acid | 1 |
| Mixed alkylated diarylamines | 2 |
| Zinc oxide | 5 |
| Channel carbon black | 50 |
| Sulfur | 1 |
| Bismuth dimethyl dithiocarbamate | 1 |

[1] The plasticizer comprises Sulfo A, normal butyl alcohol and mineral oil and is sold under the trade-name Reogen.

260° F.:

| | S | T | E | H |
|---|---|---|---|---|
| 10 minutes | 120 | 1040 | 710 | 33 |
| 15 minutes | 370 | 1780 | 680 | 40 |
| 20 minutes | 1140 | 3810 | 650 | 52 |
| 30 minutes | 1640 | 4210 | 590 | 59 |
| 45 minutes | 1640 | 4320 | 580 | 60 |

300° F.:

| | S | T | E | H |
|---|---|---|---|---|
| 2½ minutes | 430 | 1670 | 580 | 40 |
| 5 minutes | 1560 | 4450 | 625 | 59 |
| 10 minutes | 1700 | 4300 | 570 | 59 |
| 20 minutes | 1650 | 4200 | 560 | 59 |

388° F.:

| | S | T | E |
|---|---|---|---|
| 5 seconds | 650 | 2460 | 590 |
| 7½ seconds | 1320 | 3860 | 620 |
| 10 seconds | 1570 | 4160 | 560 |
| 20 seconds | 1660 | 4180 | 550 |
| 30 seconds | 1590 | 3570 | 510 |
| 60 seconds | 1410 | 3200 | 510 |

EXAMPLE 22

| | |
|---|---|
| Smoked sheet | 100 |
| Plasticizer [1] | 1 |
| Stearic acid | 1 |
| Mixed alkylated diarylamines | 2 |
| Zinc oxide | 5 |
| Channel carbon black | 50 |
| Sulfur | 1 |
| Zinc dimethyl dithiocarbamate | 1 |

[1] The plasticizer comprises Sulfo A, normal butyl alcohol and mineral oil and is sold under the trade-name Reogen.

260° F.:

| | S | T | E | H |
|---|---|---|---|---|
| 10 minutes | 170 | 1210 | 730 | 35 |
| 15 minutes | 1120 | 3870 | 670 | 52 |
| 20 minutes | 1370 | 4320 | 660 | 57 |
| 30 minutes | 1560 | 4510 | 620 | 58 |
| 45 minutes | 1670 | 4340 | 600 | 60 |

300° F.:

| | S | T | E | H |
|---|---|---|---|---|
| 2½ minutes | 1090 | 3960 | 650 | 53 |
| 5 minutes | 1380 | 4190 | 620 | 57 |
| 10 minutes | 1440 | 3960 | 570 | 58 |
| 20 minutes | 1420 | 3700 | 560 | 58 |

388° F.:

| | S | T | E |
|---|---|---|---|
| 5 seconds | 160 | 640 | 610 |
| 7½ seconds | 750 | 2550 | 580 |
| 10 seconds | 1100 | 3280 | 570 |
| 20 seconds | 1220 | 3120 | 530 |
| 30 seconds | 1070 | 2580 | 520 |
| 60 seconds | 840 | 2180 | 510 |

EXAMPLE 23

| | |
|---|---|
| Smoked sheet | 100 |
| Plasticizer [1] | 1 |
| Stearic acid | 1 |
| Mixed alkylated diarylamines | 2 |
| Zinc oxide | 5 |
| Soft gas black | 50 |
| Sulfur | 1 |
| Bismuth dimethyl dithiocarbamate | 1 |

[1] The plasticizer comprises Sulfo A, normal butyl alcohol and mineral oil and is sold under the trade-name Reogen.

260° F.:

| | S | T | E | H |
|---|---|---|---|---|
| 10 minutes | 310 | 3110 | 780 | 35 |
| 15 minutes | 470 | 3580 | 740 | 42 |
| 20 minutes | 570 | 4130 | 740 | 45 |
| 30 minutes | 550 | 3900 | 720 | 45 |
| 45 minutes | 540 | 3730 | 720 | 44 |

300° F.:

| | S | T | E | H |
|---|---|---|---|---|
| 2½ minutes | 470 | 3920 | 745 | 44 |
| 5 minutes | 600 | 3920 | 715 | 46 |
| 10 minutes | 560 | 3790 | 705 | 46 |
| 20 minutes | 460 | 3320 | 680 | 45 |

388° F.:

| | S | T | E |
|---|---|---|---|
| 5 seconds | 500 | 3400 | 670 |
| 7½ seconds | 540 | 3740 | 690 |
| 10 seconds | 560 | 3800 | 680 |
| 20 seconds | 520 | 3350 | 660 |
| 30 seconds | 490 | 3010 | 650 |
| 60 seconds | 380 | 2480 | 650 |

EXAMPLE 24

| | |
|---|---|
| Smoked sheet | 100 |
| Plasticizer [1] | 1 |
| Stearic acid | 1 |
| Mixed alkylated diarylamines | 2 |
| Zinc oxide | 5 |
| Soft gas black | 50 |
| Sulfur | 1 |
| Zinc dimethyl dithiocarbamate | 1 |

[1] The plasticizer comprises Sulfo A, normal butyl alcohol and mineral oil and is sold under the trade-name Reogen.

260° F.:

| | S | T | E | H |
|---|---|---|---|---|
| 10 minutes | 480 | 3880 | 750 | 42 |
| 15 minutes | 520 | 3830 | 740 | 43 |
| 20 minutes | 520 | 3830 | 730 | 44 |
| 30 minutes | 520 | 3680 | 730 | 44 |
| 45 minutes | 480 | 3650 | 730 | 43 |

300° F.:

| | S | T | E | H |
|---|---|---|---|---|
| 2½ minutes | 510 | 3700 | 720 | 45 |
| 5 minutes | 475 | 3590 | 720 | 44 |
| 10 minutes | 430 | 3420 | 715 | 43 |
| 20 minutes | 385 | 3040 | 700 | 41 |

388° F.:

| | S | T | E |
|---|---|---|---|
| 5 seconds | 360 | 2540 | 700 |
| 7½ seconds | 410 | 2800 | 680 |
| 10 seconds | 380 | 2680 | 680 |
| 20 seconds | 330 | 2160 | 690 |
| 30 seconds | 290 | 2040 | 710 |
| 60 seconds | 210 | 1850 | 750 |

The following Examples 25 and 26 were tested under stress at 200% instead of 300% as in the other examples:

EXAMPLE 25

| | |
|---|---|
| Smoked sheet | 100 |
| Plasticizer [1] | 1.5 |
| Stearic acid | 0.5 |
| Polymerized trimethyldihydroquinoline | 1.5 |
| Zinc oxide | 10 |
| Kaolin powder | 25 |
| Soft gas black | 25 |
| Whiting (water ground) | 75 |
| Sulfur | 1.75 |
| Benzothiazyl bisulfide | 0.5 |
| Bismuth dimethyl dithiocarbamate | 0.5 |

[1] The plasticizer comprises Sulfo A, normal butyl alcohol and mineral oil and is sold under the trade-name Reogen.

388° F.:

| | S | T | E |
|---|---|---|---|
| 5 seconds | 440 | 2040 | 515 |
| 7½ seconds | 490 | 2110 | 525 |
| 10 seconds | 480 | 2130 | 520 |
| 15 seconds | 450 | 1990 | 515 |
| 20 seconds | 410 | 1850 | 510 |
| 30 seconds | 390 | 1650 | 510 |
| 60 seconds | 310 | 1460 | 525 |

EXAMPLE 26

| | |
|---|---|
| Smoked sheet | 100 |
| Plasticizer [1] | 1.5 |
| Stearic acid | 0.5 |
| Polymerized trimethyldihydroquinoline | 1.5 |
| Zinc oxide | 10 |
| Kaolin powder | 25 |
| Soft gas black | 25 |
| Whiting (water ground) | 75 |
| Sulfur | 1.75 |
| Benzothiazyl bisulfide | 0.5 |
| Zinc dimethyl dithiocarbamate | 0.5 |

[1] The plasticizer comprises Sulfo A, normal butyl alcohol and mineral oil and is sold under the trade-name Reogen.

388° F.:

| | S | T | E |
|---|---|---|---|
| 5 seconds | 330 | 1420 | 525 |
| 7½ seconds | 520 | 1980 | 520 |
| 10 seconds | 515 | 1980 | 515 |
| 15 seconds | 460 | 1790 | 505 |
| 20 seconds | 380 | 1610 | 500 |
| 30 seconds | 360 | 1450 | 510 |
| 60 seconds | 270 | 1270 | 540 |

Vulcanization of the compounds of Examples 2, 4, 6, 7, 9, 12, 13, 14, 15, 16, 17, 18, 19, 21, 23 and 25 are embodiments of my invention.

The utility of the other bismuth dialkyl dithiocarbamates previously mentioned will be illustrated by the following examples. For purposes of comparison, I have again included the results for vulcanization at 260° F. and for a stock differing in the substitution of zinc dimethyl dithiocarbamate, an accelerator in general use, for bismuth dimethyl dithiocarbamate and the other bismuth dialkyl dithiocarbamates. The same designations are used in the preceding tabulation.

EXAMPLE 27

| | |
|---|---|
| Smoked sheet | 100 |
| Mineral oil | 1 |
| Stearic acid | 1 |
| Zinc oxide | 5 |
| Whiting | 100 |
| Heptylated diphenyl amine | 2 |
| Sulfur | 1 |
| Zinc dimethyl dithiocarbamate | 1 |

260° F.:

| | S | T | E | H |
|---|---|---|---|---|
| 10 minutes | 200 | 2060 | 760 | 42 |
| 15 minutes | 200 | 2050 | 750 | 43 |
| 20 minutes | 200 | 1980 | 755 | 43 |
| 30 minutes | 200 | 1860 | 740 | 43 |
| 45 minutes | 200 | 1725 | 740 | 41 |

300° F.:

| | S | T | E | H |
|---|---|---|---|---|
| 2½ minutes | 190 | 1930 | 755 | 43 |
| 5 minutes | 205 | 1775 | 755 | 42 |
| 10 minutes | 190 | 1615 | 750 | 41 |
| 15 minutes | 180 | 1465 | 745 | 40 |
| 20 minutes | 175 | 1565 | 775 | 40 |

388° F.:

| | S | T | E |
|---|---|---|---|
| 5 seconds | 110 | 1255 | 740 |
| 7½ seconds | 115 | 1305 | 735 |
| 10 seconds | 110 | 1140 | 730 |
| 15 seconds | 90 | 850 | 735 |
| 20 seconds | 90 | 710 | 705 |
| 30 seconds | 70 | 545 | 735 |
| 60 seconds | 55 | 430 | 755 |

EXAMPLE 28

| | |
|---|---|
| Smoked sheet | 100 |
| Mineral oil | 1 |
| Stearic acid | 1 |
| Zinc oxide | 5 |
| Whiting | 100 |
| Heptylated diphenyl amine | 2 |
| Sulfur | 1 |
| Bismuth dimethyl dithiocarbamate | 1 |

260° F.:

| | S | T | E | H |
|---|---|---|---|---|
| 10 minutes | 100 | 965 | 750 | 31 |
| 15 minutes | 165 | 1740 | 765 | 40 |
| 20 minutes | 215 | 2140 | 760 | 45 |
| 30 minutes | 210 | 2100 | 750 | 46 |
| 45 minutes | 195 | 1910 | 740 | 45 |

300° F.:

| | S | T | E | H |
|---|---|---|---|---|
| 2½ minutes | 165 | 1915 | 765 | 41 |
| 5 minutes | 225 | 2110 | 740 | 47 |
| 10 minutes | 235 | 2040 | 745 | 46 |
| 15 minutes | 215 | 1895 | 730 | 44 |
| 20 minutes | 205 | 1735 | 730 | 43 |

388° F.:

| | S | T | E |
|---|---|---|---|
| 5 seconds | 135 | 1470 | 710 |
| 7½ seconds | 155 | 2000 | 730 |
| 10 seconds | 150 | 1885 | 730 |
| 15 seconds | 145 | 1655 | 735 |
| 20 seconds | 125 | 1630 | 745 |
| 30 seconds | 120 | 1465 | 765 |
| 60 seconds | 93 | 1195 | 800 |

EXAMPLE 29

| | |
|---|---|
| Smoked sheet | 100 |
| Mineral oil | 1 |
| Stearic acid | 1 |
| Zinc oxide | 5 |
| Whiting | 100 |
| Heptylated diphenyl amine | 2 |
| Sulfur | 1 |
| Bismuth diethyl dithiocarbamate | 1 |

| 260° F.: | S | T | E | H |
|---|---|---|---|---|
| 10 minutes | 230 | 2170 | 715 | 49 |
| 15 minutes | 235 | 2040 | 680 | 50 |
| 20 minutes | 255 | 2080 | 680 | 50 |
| 30 minutes | 240 | 1960 | 670 | 51 |
| 45 minutes | 270 | 2080 | 670 | 51 |

| 300° F.: | S | T | E | H |
|---|---|---|---|---|
| 2½ minutes | 235 | 1990 | 695 | 49 |
| 5 minutes | 220 | 1865 | 700 | 49 |
| 10 minutes | 220 | 1730 | 685 | 49 |
| 15 minutes | 220 | 1715 | 695 | 47 |
| 20 minutes | 225 | 1650 | 680 | 47 |

| 388° F.: | S | T | E | |
|---|---|---|---|---|
| 5 seconds | 155 | 1615 | 670 | |
| 7½ seconds | 175 | 1710 | 765 | |
| 10 seconds | 155 | 1915 | 720 | |
| 15 seconds | 140 | 1460 | 710 | |
| 20 seconds | 135 | 1310 | 705 | |
| 30 seconds | 115 | 1070 | 700 | |
| 60 seconds | 97 | 1030 | 770 | |

EXAMPLE 30

| | |
|---|---|
| Smoked sheet | 100 |
| Mineral oil | 1 |
| Stearic acid | 1 |
| Zinc oxide | 5 |
| Whiting | 100 |
| Heptylated diphenyl amine | 2 |
| Sulfur | 1 |
| Bismuth dibutyl dithiocarbamate | 1 |

| 260° F.: | S | T | E | H |
|---|---|---|---|---|
| 10 minutes | 195 | 2030 | 720 | 48 |
| 15 minutes | 210 | 1940 | 710 | 48 |
| 20 minutes | 195 | 1815 | 690 | 48 |
| 30 minutes | 195 | 1665 | 685 | 48 |
| 45 minutes | 205 | 1645 | 675 | 47 |

| 300° F.: | S | T | E | H |
|---|---|---|---|---|
| 2½ minutes | 190 | 1785 | 705 | 46 |
| 5 minutes | 185 | 1735 | 705 | 45 |
| 10 minutes | 185 | 1515 | 695 | 43 |
| 15 minutes | 185 | 1485 | 705 | 43 |
| 20 minutes | 185 | 1400 | 695 | 43 |

| 388° F.: | S | T | E | |
|---|---|---|---|---|
| 5 seconds | 145 | 1800 | 730 | |
| 7½ seconds | 165 | 1990 | 725 | |
| 10 seconds | 150 | 1890 | 725 | |
| 15 seconds | 125 | 1570 | 755 | |
| 20 seconds | 110 | 1390 | 760 | |
| 30 seconds | 105 | 1230 | 785 | |
| 60 seconds | 85 | 830 | 800 | |

EXAMPLE 31

| | |
|---|---|
| Smoked sheet | 100 |
| Mineral oil | 1 |
| Stearic acid | 1 |
| Zinc oxide | 5 |
| Whiting | 100 |
| Heptylated diphenyl amine | 2 |
| Sulfur | 1 |
| Bismuth diamyl dithiocarbamate | 1 |

| 260° F.: | S | T | E | H |
|---|---|---|---|---|
| 10 minutes | 190 | 2120 | 750 | 46 |
| 15 minutes | 200 | 2100 | 745 | 46 |
| 20 minutes | 190 | 2080 | 755 | 46 |
| 30 minutes | 185 | 2030 | 760 | 46 |
| 45 minutes | 180 | 1900 | 740 | 46 |

| 300° F.: | S | T | E | H |
|---|---|---|---|---|
| 2½ minutes | 185 | 2110 | 765 | 44 |
| 5 minutes | 185 | 1945 | 760 | 43 |
| 10 minutes | 165 | 1905 | 785 | 41 |
| 15 minutes | 165 | 1860 | 785 | 41 |
| 20 minutes | 165 | 1780 | 780 | 41 |

| 388° F.: | S | T | E | |
|---|---|---|---|---|
| 5 seconds | 120 | 1640 | 755 | |
| 7½ seconds | 145 | 1890 | 750 | |
| 10 seconds | 140 | 1890 | 740 | |
| 15 seconds | 120 | 1265 | 705 | |
| 20 seconds | 105 | 1480 | 760 | |
| 30 seconds | 100 | 1295 | 785 | |
| 60 seconds | 85 | 680 | 745 | |

Vulcanization of the stocks of Examples 28, 29, 30 and 31 and particularly of Example 28 at 388° F. are embodiments of my invention.

I claim:
1. The improvement in the vulcanization of rubber stocks with sulfur which consists in accelerating the vulcanization at temperatures in the range approximating 335° F. to 450° F. during a period of more than 5 seconds but less than one minute with bismuth dimethyl dithiocarbamate.

2. The improvement in the vulcanization of rubber stocks with sulfur which consists in accelerating the vulcanization at temperatures of from 335° F. to 450° F. during a period of from 5 to 30 seconds with bismuth dimethyl dithiocarbamate.

3. The improvement in the vulcanization of rubber stocks with sulfur which consists in accelerating the vulcanization at temperatures in the range approximating 335° F. to 450° F. during a period of more than 5 seconds but less than one minute with bismuth dialkyl dithiocarbamate in which the alkyl groups are selected from the class consisting of methyl, ethyl, propyl, butyl and amyl groups.

4. The improvement in the vulcanization of rubber stocks with sulfur which consists in accelerating the vulcanization at temperatures of from 350° F. to 450° F. during a period of from 5 to 30 seconds with bismuth dialkyl dithiocarbamate in which the alkyl groups are selected from the class consisting of methyl, ethyl, propyl, butyl and amyl groups.

ALBERT A. SOMERVILLE.

REFERENCES CITED

The following references are of record in the file of this patent:

UNITED STATES PATENTS

| Number | Name | Date |
|---|---|---|
| 1,386,153 | Bruni | Aug. 2, 1921 |
| 1,513,122 | Nikaido | Oct. 28, 1924 |
| 2,008,861 | Gray | July 23, 1935 |
| 2,184,238 | Lichty | Dec. 19, 1939 |
| 2,304,800 | Cramer | Dec. 15, 1942 |